United States Patent
Miyata

(10) Patent No.: US 8,345,124 B2
(45) Date of Patent: Jan. 1, 2013

(54) DIGITAL CAMERA CONTROLLED BY A CONTROL CIRCUIT

(75) Inventor: Kazunori Miyata, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 425 days.

(21) Appl. No.: 12/632,861

(22) Filed: Dec. 8, 2009

(65) Prior Publication Data

US 2011/0134279 A1 Jun. 9, 2011

(30) Foreign Application Priority Data

Dec. 8, 2008 (JP) ................................ 2008-312187

(51) Int. Cl.
*H04N 5/225* (2006.01)
(52) U.S. Cl. .............. 348/231.99; 348/231.6; 348/231.9
(58) Field of Classification Search ... 348/231.99–231.9
See application file for complete search history.

(56) References Cited

U.S. PATENT DOCUMENTS

| 7,129,984 | B1 * | 10/2006 | Okada et al. ................... | 348/372 |
| 2003/0117503 | A1 * | 6/2003 | Miyashita ................... | 348/231.3 |
| 2003/0123859 | A1 * | 7/2003 | Ikeda ............................ | 386/120 |
| 2004/0169743 | A1 * | 9/2004 | Hosoda et al. ............. | 348/231.6 |

FOREIGN PATENT DOCUMENTS

| JP | 2004023540 | 1/2004 |
| JP | 2007282265 | 10/2007 |
| JP | 2007180599 | 12/2007 |

* cited by examiner

*Primary Examiner* — Chieh M Fan
*Assistant Examiner* — Dwight C Tejano
(74) *Attorney, Agent, or Firm* — NDQ&M Watchstone LLP

(57) ABSTRACT

A digital camera of the present invention comprises a control circuit executing an initialization processing of a recording medium mounted thereon and a series of photographing processings. The control circuit starts the initialization processing of the recording medium when a power of a camera body is turned on, and thereafter, determines presence/absence of an image recording operation regardless of whether or not the initialization processing has been completed. The control circuit starts the series of photographing processings when it is determined that the image recording operation has been performed, then, when either the exposure processing or one or more steps of signal processing is completed, suspends the series of photographing processings to determine whether or not the initialization processing of the recording medium has been completed, and resumes the series of photographing processings when it is determined that the initialization processing of the recording medium has been completed.

8 Claims, 4 Drawing Sheets

DIGITAL CAMERA CONTROLLED BY A CONTROL CIRCUIT

CROSS-REFERENCE TO RELATED APPLICATIONS

This application claims priority to Japanese Pat. App. No. 2008-312187, filed Dec. 8, 2008, which application is incorporated herein by reference.

BACKGROUND OF THE INVENTION

1. Field of the Invention

The present invention relates to a digital camera on which a recording medium can be mounted, and which executes an initialization processing of the recording medium when a power of its camera body is turned on.

2. Description of Related Art

In a conventional digital camera, when a power of a camera body is turned on, performed is an initialization processing of a recording medium including a recognition processing of media information such as free space information of the recording medium or the like to allow writing data onto and reading out data from the recording medium mounted on the camera. After completion of the initialization processing, calculated is the number of images which can be thereafter recorded on the recording medium (hereinafter referred to as the number of photographable images) based on the free space information included in the media information obtained by the initialization processing, and the number of photographable images information indicating said number is displayed on a display. Thereafter, when the user presses a shutter button, performed is a series of photographing processings in which a predetermined image processing and thereafter a compression processing are performed on an image signal obtained from an image sensor formed by a CCD or the like, and then an image file is formed from a compressed image data thereby obtained and recorded on the recording media.

There has been proposed a digital camera which first obtains only memory card management information from a memory card when the power of the camera body is turned on, and then, when the shutter button is pressed, a processing of creating pickup image data is executed and thereafter the initialization processing of the memory card is executed (Japanese Laid-Open Patent Publication No. 2004-23540).

However, in a conventional digital camera, after the initialization processing of the recording medium is completed and the number of photographable images is calculated based on the medium information obtained by the initialization processing, the presence or absence of a pressing operation of the shutter button is determined. Therefore, the problem is the fact that, in the case where the recording medium which has a large recording capacity is mounted, it takes a long time for the initialization processing of the recording medium, and as a result, the user has to wait a long time for the camera body to become in a photographable state in which the series of photographing processings is performed in response to the pressing operation of the shutter button after the power of the camera body is turned on.

SUMMARY OF THE INVENTION

An object of the present invention is to provide a digital camera capable of making the waiting time after the power of a camera body is turned on until the camera body becomes in a photographable state shorter than conventional ones in the case where a recording medium having a large recording capacity is mounted thereon.

A digital camera according to the present invention on which a recording medium can be mounted, comprises an image sensor, and a control circuit executing a series of photographing processings including subjecting an image signal obtained by an exposure processing of an imaging area of the image sensor to one or more steps of signal processing, and then recording the image signal thereby obtained on the recording medium. The control circuit comprises a recording medium initialization processing unit performing an initialization processing of the recording medium mounted on the digital camera, and a control processing unit performing control of operation of the recording medium initialization processing unit and the series of photographing processings. The control processing unit comprises:

an initialization processing starting unit making the recording medium initialization processing unit start the initialization processing of the recording medium when a power of a camera body is turned on;

an image recording operation presence/absence determining unit determining presence or absence of an image recording operation by a user after the initialization processing by the recording medium initialization processing unit is started;

a processing starting unit starting the series of photographing processings when it is determined that the image recording operation by a user has been performed;

an initialization processing completion determining unit, at the time of completion of either the exposure processing or the one or more steps of signal processing after the series of photographing processings is started, suspending the series of photographing processings to determine whether or not the initialization processing by the recording medium initialization processing unit has been completed; and a processing resuming unit resuming the series of photographing processings when it is determined that the initialization processing by the recording medium initialization processing unit has been completed.

In the digital camera according to the present invention, when the power of the camera body is turned on, the control processing unit determines the presence or absence of the image recording operation by a user after making the recording medium initialization processing unit start the initialization processing of the recording medium without waiting until completion of the initialization processing. In the case where the image recording operation such as pressing operation of the shutter button or the like is performed by a user, at the time of completion of either the exposure processing or the one or more steps of signal processing after the series of photographing processings is started, the control processing unit suspends the series of photographing processings to determine whether or not the initialization processing of the recording medium has been completed. Here, in the case where the initialization processing of the recording medium has already been completed, the series of photographing processings is promptly resumed, while in the case where the initialization processing of the recording medium has not yet completed, the series of photographing processings is resumed after waiting until the completion of the initialization processing. Thus, the image signal obtained from the image sensor in response to the operation of the image recording operation by a user is subjected to the one or more steps of signal processing and thereafter recorded on the recording medium.

In the digital camera according to the present invention, as described above, when the power of the camera body is turned on, the control processing unit determines the presence or absence of the image recording operation by a user after making the initialization processing of the recording medium started, without waiting until the completion of the initialization processing. Therefore, even in the case where the recording medium having a large recording capacity is mounted, the camera body becomes in the photographable state in a short time after the power of the camera body is turned on.

In a particular configuration, at the time of completion of the one or more steps of signal processing, the initialization processing completion determining unit suspends the series of photographing processings to determine whether or not the initialization processing by the recording medium initialization processing unit has been completed. According to this particular configuration, the waiting time after the series of photographing processings is suspended until it is resumed can be minimized, or nearly zero.

In another particular configuration, the recording medium initialization processing unit comprises a medium information recognizing unit recognizing medium information of the recording medium mounted on the digital camera, and the processing resuming unit comprises:

a recording propriety determining unit, when it is determined that the initialization processing by the recording medium initialization processing unit has been completed, determining whether or not the image signal obtained through the one or more steps of signal processing can be recorded on the recording medium in a recording processing thereafter based on the medium information obtained by the initialization process;

a recording processing unit, when it is determined that the image signal obtained through the one or more steps of signal processing can be recorded on the recording medium in the recording processing thereafter, recording the image signal on the recording medium in the recording processing thereafter; and an annunciation unit, when it is determined that the image signal obtained through the one or more steps of signal processing cannot be recorded on the recording medium in the recording processing thereafter, annunciating a determination result.

In the particular configuration described above, the medium information including free space information of the recording medium mounted on the digital camera is recognized by the recording medium initialization processing unit. Then, when it is determined by the control processing unit that the initialization processing by the recording medium initialization processing unit has been completed, it is determined whether or not the image signal obtained through the one or more steps of signal processing can be recorded on the recording medium in the recording processing thereafter based on the medium information. In the case where the recording is possible, the image signal is recorded on the recording medium, while in the case where the recording is impossible, the impossibility is annunciated by means of display on an image display device or sound.

In a further particular configuration, the digital camera comprises an image display device, and the recording medium initialization processing unit comprises a display processing unit, after a recognizing processing of the medium information by the medium information recognizing unit is completed, displaying on the image display device the number of photographable images information which indicates the number of images which can be thereafter recorded on the recording medium based on the medium information recognized by the medium information recognizing unit. Therefore, the user can recognize the number of photographable images by seeing the image display device, and perform the image recording operation thereafter while recognizing the number of photographable images.

In a still further particular configuration, the control processing unit comprises:

a user operation presence/absence determining unit, after the initialization processing by the recording medium initialization processing unit is started, determining presence or absence of a user operation which requires an access to the recording medium;

a second initialization processing completion determining unit determining whether or not the initialization processing by the recording medium initialization processing unit has been completed, when it is determined that the user operation which requires the access to the recording medium has been performed;

an access processing executing unit executing an access processing to the recording medium in accordance with the user operation, when it is determined that the initialization processing by the recording medium initialization processing unit has been completed.

In the particular configuration described above, when a user operation which requires an access to the recording medium, such as an operation for reproducing data recorded on the recording medium, is performed during the initialization processing of the recording medium, the control processing unit waits until the completion of the initialization processing of the recording medium to execute access processing in accordance with the user operation.

As described above, according to the digital camera of the present invention, in the case where the recording medium which has a large recording capacity is mounted, it is possible to make the waiting time after the power of the camera body is turned on until the camera body becomes in a photographable state shorter than conventional digital cameras.

DETAILED DESCRIPTION OF THE PREFERRED EMBODIMENT

A preferred embodiment of the present invention is described in detail below with reference to the drawings.

Figure 1:
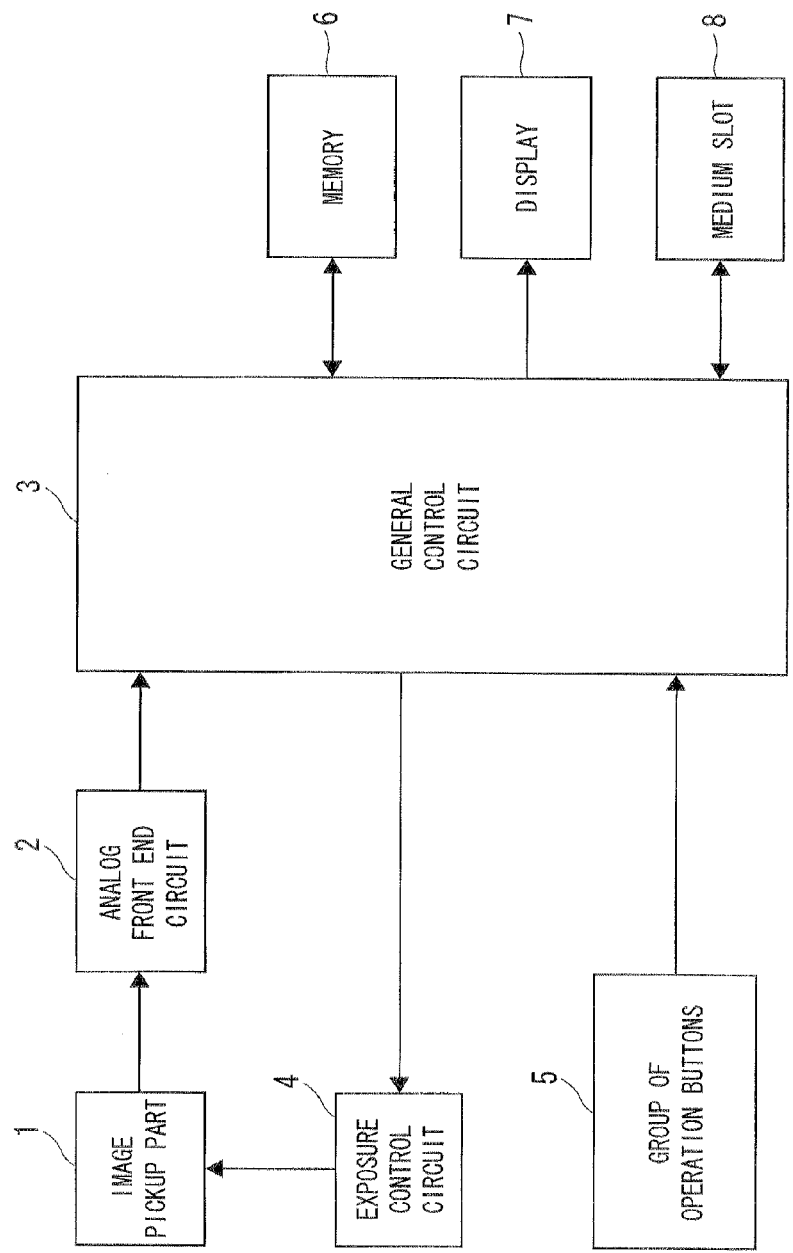
FIG. 1 is a block diagram illustrating a structure of a digital camera according to the present invention.

As shown in FIG. 1, a digital camera according to the present invention comprises an image pickup part 1 including an image sensor formed by a CCD or the like, and an analog front end circuit 2 subjecting an image signal obtained from the image pickup part 1 to an A/D converting processing. A general control circuit 3 formed by a microcomputer is connected to the analog front end circuit 2. An exposure control circuit 4 controlling an exposure operation of the image sensor is connected to the image pickup part 1, and the operation of the exposure control circuit 4 is controlled by the general control circuit 3.

To the general control circuit 3, connected are a group of operation buttons 5 comprising a plurality of operation buttons including a shutter button, a memory 6 for temporarily storing image data during an image processing, a display 7 for displaying an image obtained by shooting, and a medium slot 8 of a recording medium for recording image data. The memory 6 consists of, for example, a volatile memory.

In the digital camera described above, the image signal obtained from the image pickup part 1 is supplied to the analog front end circuit 2 and then subjected to the A/D converting processing. Digital image data thereby obtained passes through the general control circuit 3 and is temporarily stored in the memory 6. Thereafter, the image data is read out by the general control circuit 3 and subjected to a predetermined image processing to be outputted to the display 7 thereafter. As a result, an image (a through image) shot by the image pickup part 1 is displayed on the display 7 in real time.

In the case where the shutter button is pressed with the through image displayed on the display 7 as described above, an imaging area of the image pickup part 1 is exposed at the time the shutter button is pressed. The image signal thereby obtained from the image pickup part 1 is supplied to the analog front end circuit 2 and then subjected to the A/D converting processing. The digital image data obtained from the analog front end circuit 2 passes through the general control circuit 3 and is temporarily stored in the memory 6. This image data is read out by the general control circuit 3 and subjected sequentially to the predetermined image processing and a compression processing. An image file is created from compressed image data thereby obtained. The created image file is temporarily stored in the memory 6, and then recorded in the recording medium (not shown) mounted on the medium slot 8. Thus, in response to a pressing operation of the shutter button, performed is a series of photographing processings comprising an exposure processing, predetermined image processing, compression processing, file creation processing and recording processing on the recording medium.

Figure 2:
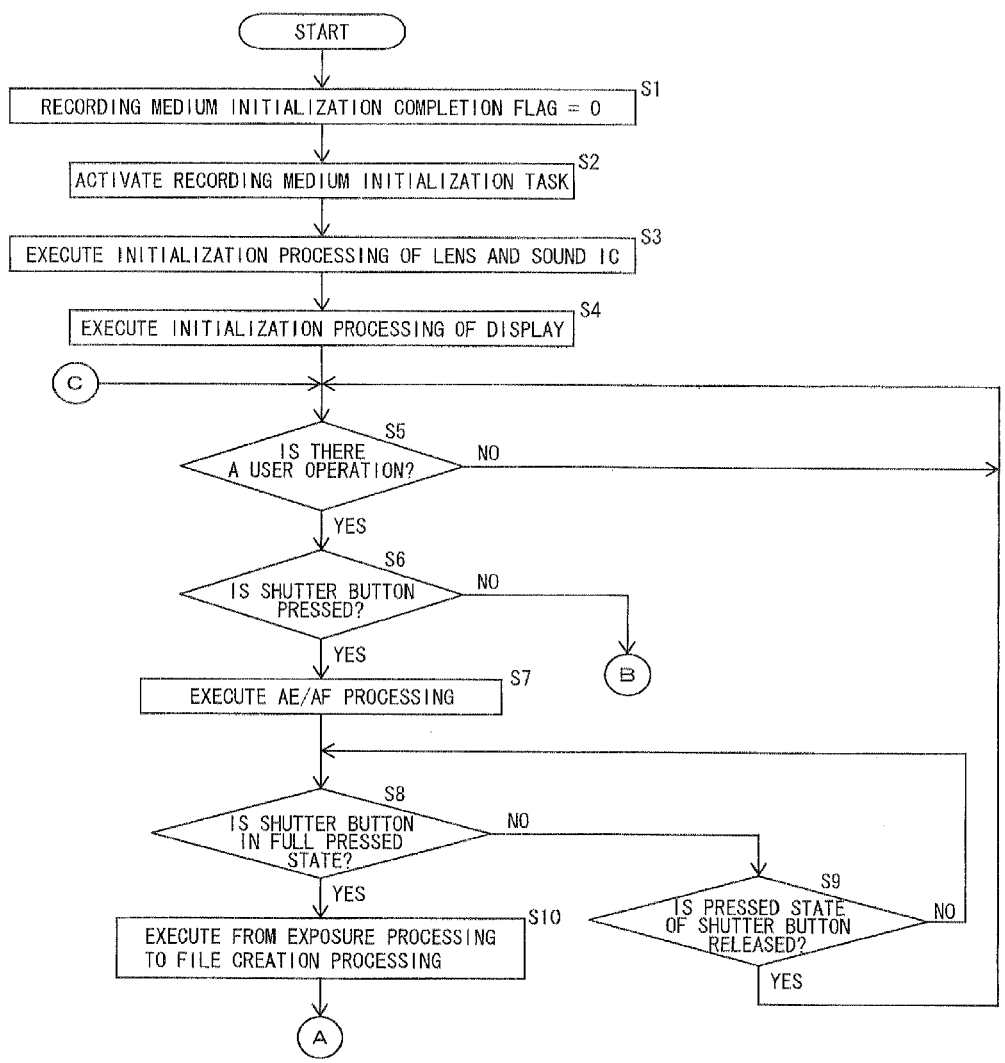
FIG. 2 is a flow chart showing a main task processing executed in the digital camera.
Figure 3:
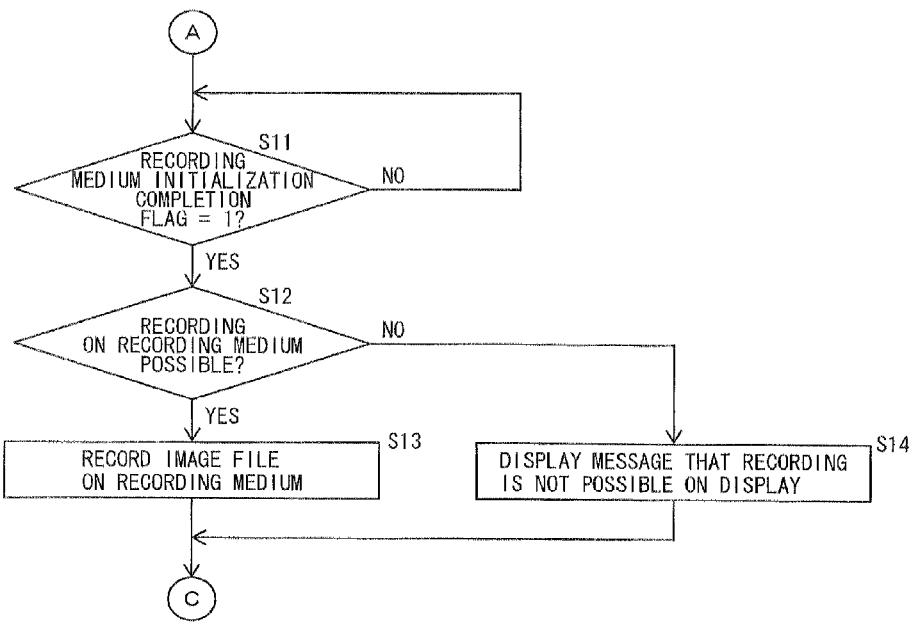
FIG. 3 is a first following part of the flow chart shown in FIG. 2.
Figure 4:
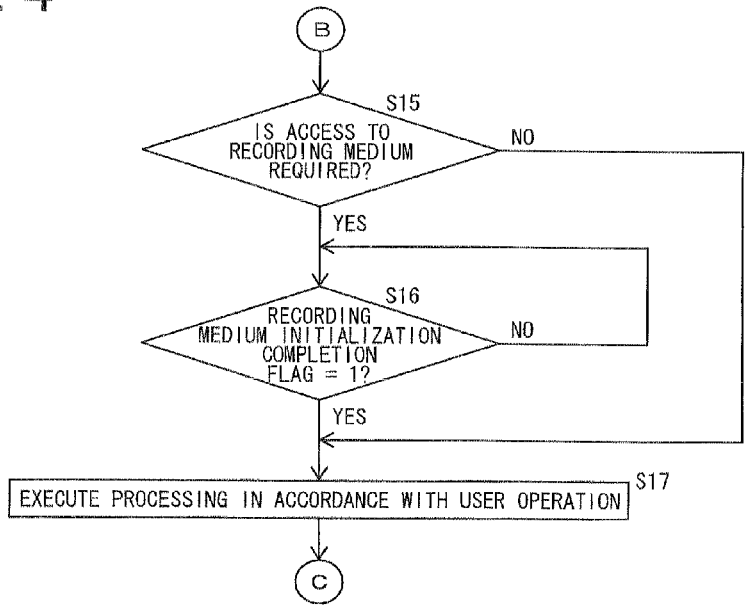
FIG. 4 is a second following part of the flow chart shown in FIG. 2.

FIGS. 2 to 4 show a main task processing executed by the general control circuit 3 described above with the power of the camera body on. The general control circuit 3 also executes an initialization processing of the recording medium which allows writing data onto and reading out data from the recording medium mounted on the medium slot 8 as to be described later. A built-in memory of the general control circuit 3 is provided with a write-in region for a recording medium initialization completion flag which indicates whether or not the initialization processing of the recording medium has been completed.

After the power of the camera body is turned on, first, in step S1 of FIG. 2, a value of the recording medium initialization completion flag is set to "zero" which indicates that the initialization processing of the recording medium has not yet been completed. Next in step S2, a recording medium initialization task to be described later is activated, and then in step S3, executed are conventional initialization processings of the lens and a sound IC. Subsequently in step S4, the initialization processing of the display is executed. In this display initialization processing, in a similar manner to the conventional way, the through image taken by the image sensor is started to be displayed. Also, it is determined whether or not the value of the recording medium initialization completion flag is "one" which indicates that the initialization processing of the recording medium has been completed. In the case where the initialization processing of the recording medium has been completed, camera setting information such as ON/OFF information of an auto focus function is displayed on the display, and the number of photographable images is calculated based on free space information included in the media information obtained by the initialization processing of the recording medium to display the number of photographable images on the display. In the case where the initialization processing of the recording medium has not yet been completed, only the camera setting information is displayed on the display.

Thereafter, in step S5, it is determined whether or not a user operation has been performed. If the result is NO, the same determination is repeated in step S5. If the result is YES, the flow proceeds to step S6 in which it is determined whether or not said user operation is the pressing operation of the shutter button.

In the case where the shutter button has been pressed and therefore the result of step S6 is YES, the flow proceeds to step S7 in which an AE (Automatic Exposure) processing and an AF (Automatic Focus) processing are executed. Thereafter, in step S8, it is determined whether or not the shutter button has been in a full pressed state. If the result is NO, it is determined whether or not a pressed state of the shutter button has been released in step S9. If the result is YES, the flow returns to step S5 in which it is determined whether or not a user operation has been performed. If the result of step S9 is NO, the flow returns to step S8 in which it is determined whether or not the shutter button has been in full pressed state.

The shutter button has been in full pressed state and therefore the result of step S8 is YES, the flow proceeds to step S10, in which executed sequentially are the exposure processing, predetermined image processing, compression processing, and file creation processing which are included in the series of photographing processings described above, and an image file thereby obtained is stored in the memory. Subsequently, in step S11 of FIG. 3, it is determined whether or not the value of the recording medium initialization completion flag is "one". If the result is NO, the same determination is repeated in step S11.

The value of the recording medium initialization completion flag is "one", and therefore the result of step S11 is YES, the flow proceeds to step S12 in which it is determined whether or not an image file stored in the memory in step S10 described above can be recorded on the recording medium by comparing the free space information included in the media information obtained by the initialization processing of the recording medium and volume of said image file. If the result is YES, said image file is recorded on the recording medium in step S13. And then, the flow returns to step S5 of FIG. 2, and the presence and absence of the user operation is again monitored. In contrast, in the case where it is determined that said image file cannot be recorded on the recording medium in step S12 of FIG. 3, the result of the determination is displayed on the display in step S14. And then, the flow returns to step S5 of FIG. 2, and then, the presence and absence of the user operation is again monitored.

In the case where a user operation other than the pressing operation of the shutter button has been performed and therefore the result of step S6 is NO, the flow proceeds to step S15 of FIG. 4 in which it is determined whether or not said user operation is an operation which requires an access to the recording medium such as a pressing operation of a menu button for displaying the file information of the image file recorded on the recording medium or the like, a pressing operation of a reproduction button for reproducing the image data recorded on the recording medium, a USB cable inserting operation or the like. If the result is NO, a processing in accordance with said user operation is executed in step S17, and the flow returns to step S5 of FIG. 2 in which the presence and absence of the user operation is again monitored.

In the case where the user operation other than the pressing operation of the shutter button is the operation which requires an access to the recording medium, and therefore the result of step S15 of FIG. 4 is YES, the flow proceeds to step S16 in which it is determined whether or not the value of the recording medium initialization completion flag is "one". If the result is NO, the same determination is repeated in step S16. In the case where the value of the recording medium initialization completion flag is "one", and therefore the result of step S16 is YES, a processing in accordance with said user operation is performed in step S17. And then, the flow returns to step S5 of FIG. 2 in which the presence and absence of the user operation is again monitored.

According to the procedure described above, after the power of the camera body is turned on, the initialization processing of the recording medium is started, and thereafter, executed are the initialization processing of the lens, the initialization processing of the sound IC, and the initialization processing of the display. In the initialization processing of the display, in the case where the recording medium mounted on the media slot has a small recording capacity and the initialization processing of the recording medium has already been completed, the camera setting information and the number of photographable images are displayed on the display while overlapping with the through image. In the case where the recording medium mounted on the media slot has a large recording capacity and the initialization processing of the recording medium has not yet been completed, only the camera setting information is displayed on the display while overlapping with the through image. Thereafter, the presence and absence of the user operation is monitored regardless of whether or not the initialization processing of the recording medium has been completed.

In the case where the pressing operation of the shutter button has been performed, the series of photographing processings described above is started, and then, at the time of completion of the file creation processing, it is determined whether or not the initialization processing of the recording medium has been completed. In the case where the initialization processing of the recording medium has already been completed, the series of photographing processings is promptly resumed, while in the case where the initialization processing of the recording medium has not yet been completed, the series of photographing processings is resumed after the completion of the initialization processing. As a result, recorded on the recording medium is the image file consisting of the image data of the image shot by the image pickup part in response to the pressing operation of the shutter button. However, in the case where the recording medium has a small free space and the image file obtained by the file creation processing cannot be recorded on the recording medium, such a message is displayed on the display.

Also, in the case where an operation which requires an access to the recording medium has been performed, at the time such an operation is determined to have been performed, it is determined whether or not the initialization processing of the recording medium has been completed. In the case where the initialization processing of the recording medium has already been completed, the processing in accordance with the operation is promptly executed, while in the case where the initialization processing of the recording medium has not yet been completed, the processing in accordance with the operation is executed after the completion of the initialization processing.

Figure 5:
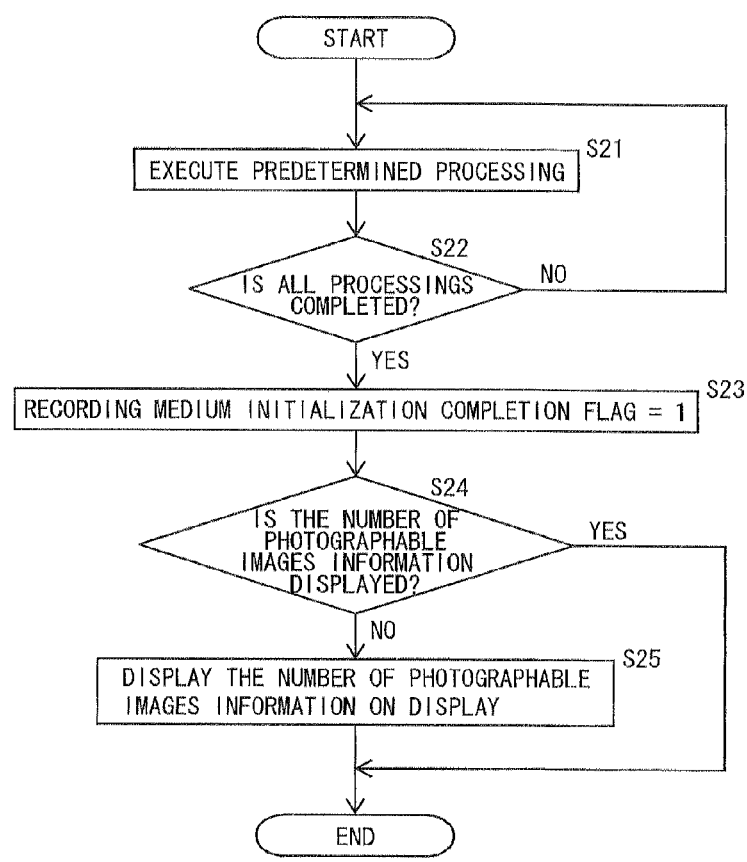
FIG. 5 is a flow chart showing a recording medium initialization task processing executed in the digital camera.

FIG. 5 shows a recording medium initialization task processing executed by the general control circuit 3. This task processing and the main task processing shown in FIGS. 2 and 4 are executed simultaneously by multiple processing.

In the recording medium initialization task processing, first, in step S21, executed is a predetermined processing required for allowing writing data onto and reading out data from the recording medium, namely, an FAT (File Allocation Tables) information obtaining processing, or a media information recognizing processing. And then, in step S22, it is determined whether or not the predetermined processing has been completed. If the result is NO, the flow returns to step S21.

Thereafter, if the predetermined processing has been completed and therefore the result of step S22 is YES, the flow proceeds to step S23 in which the value of the recording medium initialization completion flag is set to "one". Next in step S24, it is determined whether or not the number of photographable images information is already displayed on the display. If the result is NO, in step S25, the number of photographable images is calculated based on the free space information included in the media information recognized by the media information recognizing processing, and the number of photographable images information is displayed on the display and the procedure is completed. In contrast, if the result of step S24 is YES, the flow bypasses step S25 and completes the procedure.

According to the procedure described above, when the predetermined processing including the FAT information obtaining processing and the media information recognizing processing is completed, the value of the recording medium initialization completion flag is set to "one". Also, in the case where the number of photographable images information is not displayed on the display in the initialization processing of the display shown in step S4 of FIG. 2, the number of photographable images information is displayed on the display.

In the digital camera according to the present invention, when the power of the camera body is turned on, determined is the presence or absence of the pressing operation of the shutter button regardless of whether or not the initialization processing of the recording medium has been completed. Therefore, even in the case where the recording medium mounted on the digital camera has a large recording capacity, the camera body becomes in the photographable state in a short time after the power of the camera body is turned on.

In the embodiment described above, as shown in FIGS. 2 and 3, it is determined whether or not the initialization processing of the recording medium has been completed at the time of completion of the file creation processing after the series of photographing processings is started in response to the pressing operation of the shutter button. However, it is also possible to employ a structure in which the determination is performed at the time of the completion of the exposure processing, a structure in which the determination is performed at the time of the completion of the predetermined image processing, or a structure in which the determination is performed at the time of the completion of the compression processing.

Also, the recording medium initialization completion flag may be stored in a register in a CPU which forms the general control circuit.

What is claimed is:

1. A digital camera controlled by a control circuit comprising:

an image sensor; and the control circuit for executing a series of photographing processings including subjecting an image signal obtained by an exposure processing of an imaging area of the image sensor to one or more steps of signal processing, and then recording the image signal thereby obtained on a recording medium, wherein the control circuit comprises:
a recording medium initialization processing unit which performs an initialization processing of the recording medium mounted on the digital camera, and
a control processing unit which performs control of operation of the recording medium initialization processing unit and the series of photographing processings,
wherein the control processing unit comprising:
an initialization processing starting unit which causes the recording medium initialization processing unit to start the initialization processing of the recording medium when a power of a camera body is turned on;
an image recording operation presence/absence determining unit which determines presence or absence of an image recording operation by a user after the initialization processing by the recording medium initialization processing unit is started;
a processing starting unit which starts the series of photographing processings when it is determined that the image recording operation by a user has been performed;
an initialization processing completion determining unit which, at the time of completion of either the exposure processing or the one or more steps of signal processing after the series of photographing processings is started, suspends the series of photographing processings to determine whether or not the initialization processing by the recording medium initialization processing unit has been completed; and
a processing resuming unit which resumes the series of photographing processings when it is determined that the initialization processing by the recording medium initialization processing unit has been completed
wherein the processing resuming unit comprises:
a recording propriety determining unit which, when it is determined that the initialization processing by the recording medium initialization processing unit has been completed, determines whether or not the image signal obtained through the one or more steps of signal processing can be recorded on the recording medium in a recording processing based on medium information of the recording medium obtained by the initialization process.

2. The digital camera according to claim 1, wherein the control processing unit comprises:
a user operation presence/absence determining unit which, after the initialization processing by the recording medium initialization processing unit is started, determines presence or absence of a user operation which requires an access to the recording medium;
a second initialization processing completion determining unit determining whether or not the initialization processing by the recording medium initialization processing unit has been completed, when it is determined that the user operation which requires the access to the recording medium has been performed;
an access processing executing unit which executes an access processing to the recording medium in accordance with the user operation, when it is determined that the initialization processing by the recording medium initialization processing unit has been completed.

3. The digital camera according to claim 1, wherein the processing resuming unit further comprises:
a recording processing unit which, when it is determined that the image signal obtained through the one or more steps of signal processing can be recorded on the recording medium in the recording processing thereafter, records the image signal on the recording medium in the recording processing thereafter.

4. The digital camera according to claim 1, wherein, at the time of completion of the one or more steps of signal processing, the initialization processing completion determining unit suspends the series of photographing processings to determine whether or not the initialization processing by the recording medium initialization processing unit has been completed.

5. The digital camera according to claim 4, wherein, at the time of completion of the one or more steps of signal processing, the initialization processing completion determining unit suspends the series of photographing processing to determine whether or not the initialization processing by the recording medium initialization processing unit has been completed.

6. The digital camera according to claim 4, wherein control processing unit comprises:
a user operation presence/absence determining unit which, after the initialization processing by the recording medium initialization processing unit is started, determines presence or absence of a user operation which requires an access to the recording medium;
a second initialization processing completion determining unit which determines whether or not the initialization processing by the recording medium initialization processing unit has been completed, when it is determined that the user operation which requires the access to the recording medium has been performed;
an access processing executing unit which executes an access processing to the recording medium in accordance with the user operation, when it is determined that the initialization processing by the recording medium initialization processing unit has been completed.

7. A digital camera controlled by a control circuit comprising:
an image sensor; and
the control circuit which executes a series of photographing processings including subjecting an image signal obtained by an exposure processing of an imaging area of the image sensor to one or more steps of signal processing, and then recording the image signal thereby obtained on a recording medium,
wherein the control circuit comprises:
a recording medium initialization processing unit which performs an initialization processing of the recording medium mounted on the digital camera, and
a control processing unit which performs control of operation of the recording medium initialization processing unit and the series of photographing processings,
wherein the control processing unit comprising:
an initialization processing starting unit which causes the recording medium initialization processing unit to start the initialization processing of the recording medium when a power of a camera body is turned on;
an image recording operation presence/absence determining unit which determines presence or absence of an image recording operation by a user after the initialization processing by the recording medium initialization processing unit is started;
a processing starting unit which starts the series of photographing processings when it is determined that the image recording operation by a user has been performed;
an initialization processing completion determining unit which, at the time of completion of either the exposure processing or the one or more steps of signal processing after the series of photographing processings is started, suspends the series of photographing processings to determine whether or not the initialization processing by the recording medium initialization processing unit has been completed; and a processing resuming unit which resumes the series of photographing processings when it is determined that the initialization processing by the recording medium initialization processing unit has been completed wherein, at the time of completion of the one or more steps of signal processing, the initialization processing completion determining unit suspends the series of photographing processings to determine whether or not the initialization processing by the recording medium initialization processing unit has been completed; and the recording medium initialization processing unit comprises a medium information recognizing unit recognizing medium information of the recording medium mounted on the digital camera, and the processing resuming unit comprises:

a recording propriety determining unit which, when it is determined that the initialization processing by the recording medium initialization processing unit has been completed determines whether or not the image signal obtained through the one or more steps of signal processing can be recorded on the recording medium in a recording processing thereafter based on the medium information obtained by the initialization process;

a recording processing unit which, when it is determined that the image signal obtained through the one or more steps of signal processing can be recorded on the recording medium in the recording processing thereafter, records the image signal on the recording medium in the recording processing thereafter; and an annunciation unit which, when it is determined that the image signal obtained through the one or more steps of signal processing cannot be recorded on the recording medium in the recording processing thereafter, annunciates a determination result.

8. The digital camera according to claim 7, wherein the digital camera further comprises an image display device, and the recording medium initialization processing unit comprises a display processing unit which, after a recognizing processing of the medium information by the medium information recognizing unit is completed, displays on the image display device the number of photographable images information which indicates the number of images which can be thereafter recorded on the recording medium based on the medium information recognized by the medium information recognizing unit.

* * * * *